Nov. 24, 1925.

W. J. BELCHER 1,563,065

CHAIN AND PARTS THEREFOR

Filed Oct. 31, 1923      2 Sheets-Sheet 1

INVENTOR.
Warren J. Belcher
BY
his ATTORNEYS

Nov. 24, 1925.                                            1,563,065
W. J. BELCHER
CHAIN AND PARTS THEREFOR
Filed Oct. 31, 1923          2 Sheets-Sheet 2
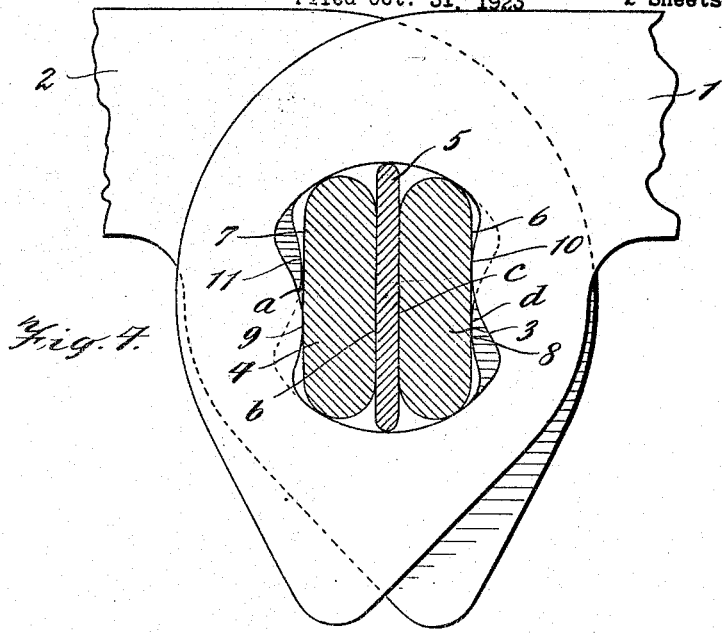
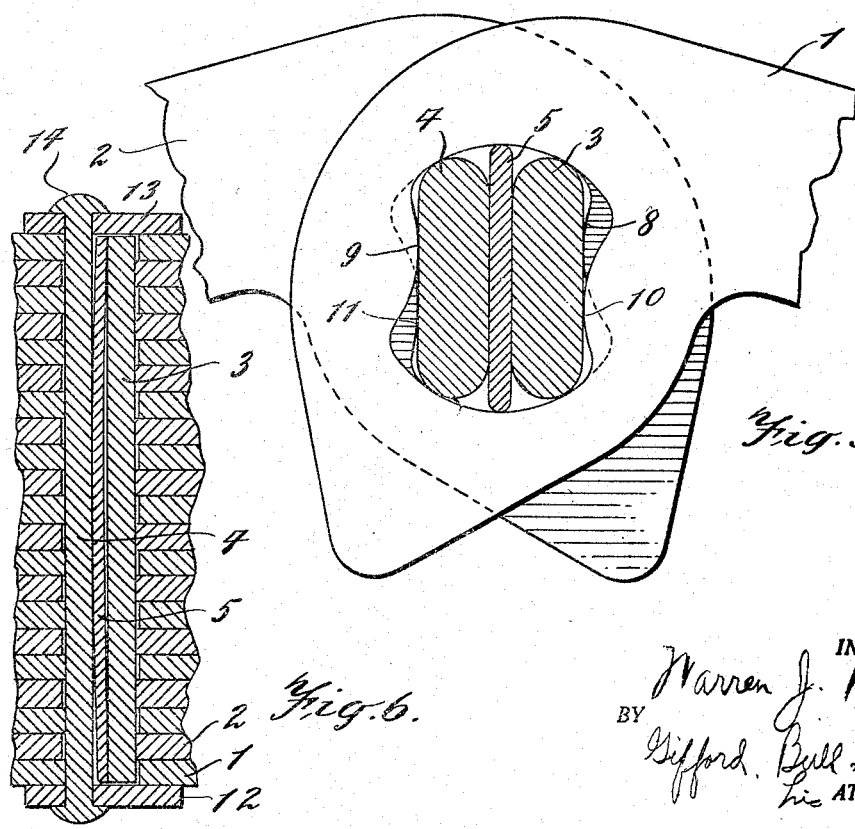
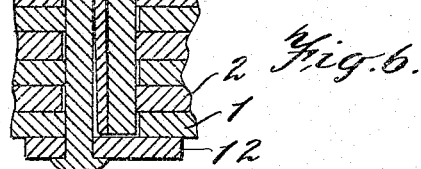
INVENTOR
Warren J. Belcher
BY Gifford, Bull & Scull
ATTORNEYS Patented Nov. 24, 1925.

1,563,065

UNITED STATES PATENT OFFICE.

WARREN J. BELCHER, OF HARTFORD, CONNECTICUT, ASSIGNOR TO THE WHITNEY MFG. CO., OF HARTFORD, CONNECTICUT, A CORPORATION OF CONNECTICUT.

CHAIN AND PARTS THEREFOR.

Application filed October 31, 1923. Serial No. 671,838.

*To all whom it may concern:*

Be it known that I, WARREN J. BELCHER, a citizen of the United States, residing at Hartford, in the county of Hartford and State of Connecticut, have invented certain new and useful Improvements in Chains and Parts Therefor, of which the following is a specification.

My invention relates to link chains of the silent type and consists of certain novel parts and combinations of parts to render the chain more efficient, durable and noiseless in operation, which novel parts and combinations will be specifically described herein and pointed out in the appended claims.

Figure 1:
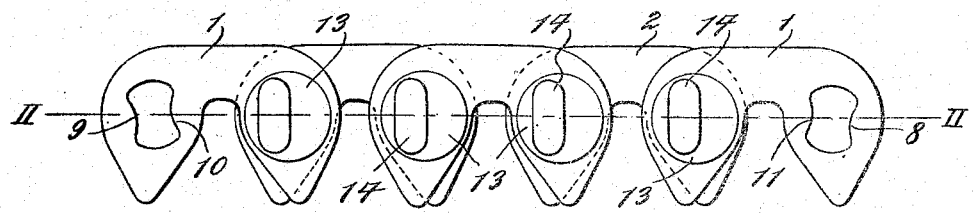
Figure 2:
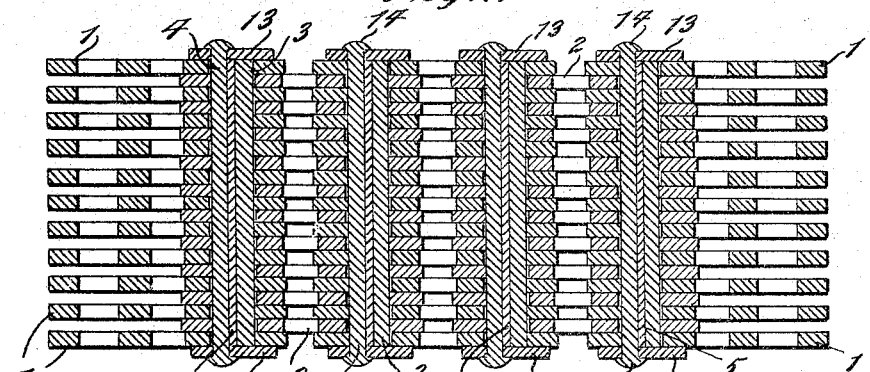
Figure 3:
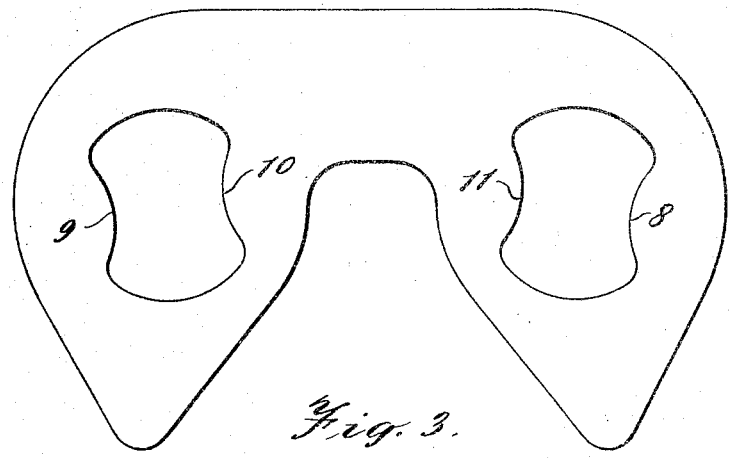

My invention will be better understood by reading the following description taken in connection with the drawings showing one embodiment thereof and in which Fig. 1 is a side view of a portion of a chain containing one embodiment of my invention; Fig. 2 is an inverted sectional view taken along the plane of the line II—II of Fig. 1; Fig. 3 is a side view of a single link; Fig. 4 is a sectional elevation on a scale larger than the preceding figures illustrating the positions assumed by the links of adjacent pitches and the pin passing through the openings therein on a straight run of the chain; Fig. 5 is a view similar to Fig. 4 illustrating the joint between the two pitches in the flexed position and Fig. 6 is an enlarged section through the pin members showing a portion of links.

Like characters indicate like parts throughout the drawings.

The general outline of the links is the same as that of links heretofore used for chains of this type. The chain comprises a plurality of links 1, placed side by side and a plurality of similar links 2 placed side by side and overlapping the links 1. The links are provided at each end with an opening through which the pin member is placed. The pin comprises three members 3, 4 and 5. These members preferably have flat, parallel sides and rounded edges. The members 3 and 4 are similar and preferably identical. The member 5 is thinner than the members 3 and 4. It is well-known that chains of this type, after they have been in use for a considerable period of time, become longer, due to the wear between the different movable parts. In the structure illustrated in the drawings, particular reference being made to Figure 4, there are four contact points, $a$, $b$, $c$ and $d$, for each link which enter into the lengthening of the chain, due to wear. With a chain of any substantial length, it will be understood that these points will be multiplied according to the length of the chain and the length of the pitches.

My invention includes the novel idea of a movable or replaceable wear plate 5 for the purpose of taking up this slack which develops during the use of the chain. By reason of the simplicity in section of the members 3, 4 and 5, each of these members may be manufactured inexpensively by merely rolling round stock of the proper size to the cross section shown. After the chain has been in service for such period of time as to become lengthened to an objectionable degree, this may be readily corrected by moving the members 5 and replacing them with similar members of somewhat greater cross section, so that the wear will be compensated for and the chain brought back to its original length. The increased thickness of the member 5 which is substituted for that member in the original chain, will depend, of course, upon the amount of wear which has taken place.

The flat sides 6 and 7 of the members 3 and 4 are engaged by rounded surfaces 8 and 9 of the links 2 and 1, respectively, and the members 3, 4 and 5 are pinched between the surfaces 8 and 9, by the load on the chain. Similar surfaces 10 and 11, on the links 1 and 2, respectively, also engage the surfaces 6 and 7, but these contacts do not take any part in carrying the load of the chain but are placed on the links to reduce the initial backlash and to strengthen the links. During the flexing of the joints, the surfaces 8, 9, 10 and 11, roll upon the surfaces 6 and 7 of the members 3 and 4, thus reducing friction to a minimum.

As shown in Fig. 6, the member 4 is shorter than the member 5, which extends through the washers 12 and 13 and is riveted over at 14. The member 5 is also substantially the same length as the member 4. The members 5 are preferably bent to give a slight resiliency to the joint. It will be noted that the ends of the member 5 engage the member 4 and the middle engages the member 3, obviously the member 5 may be bent the other way. The members 4 and 5 are held against longitudinal movement by the washers 13.

While I have illustrated one form of my invention and have described the same in detail, I desire it to be understood that I am not to be limited to the exact arrangement shown because the application of a wear plate having the functions and securing the results of the member 5, may be applied to a great variety of joints and is certainly not limited in its use with pins like that shown that may be used with pins of many different designs.

While my invention is useful in connection with chains of all sizes, perhaps its greatest usefulness will be found in connection with chains of the larger sizes.

I claim:

1. In a chain of the link type, a pin comprising two parallel members and a plain flat wear plate between said members.

2. In a chain of the link type, a pin comprising two flat members of rectangular cross section and a flat wear plate between said members.

3. In a chain of the link type, a pin comprising two members with parallel adjacent surfaces and a wear member between said members, said members and the wear plate being substantially fixed relative to each other.

4. In a chain of the link type, a pin comprising two flat members having rectangular cross section placed side by side and a flat wear plate between said members, said wear plate being slightly bent from edge to edge to lend resiliency to the joint.

5. In a chain of the link type, a pin comprising two members having rectangular cross section placed side by side, a wear plate between said members, and curved surfaces on the links engaging said pin members.

WARREN J. BELCHER.